Figure 1:
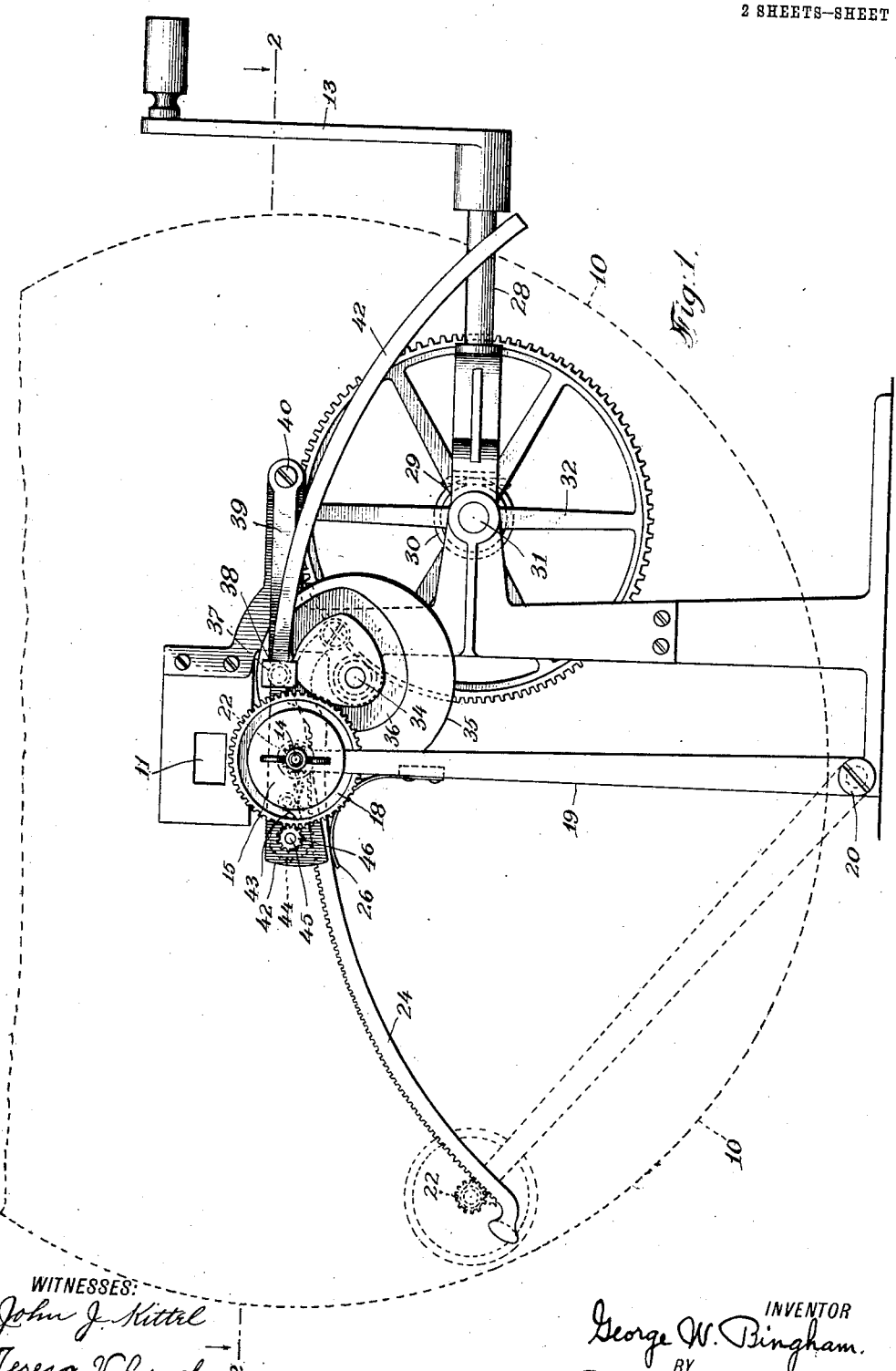

G. W. BINGHAM.
MOVING PICTURE MACHINE.
APPLICATION FILED OCT. 25, 1909.

971,589.

Patented Oct. 4, 1910.
2 SHEETS—SHEET 1.

WITNESSES:
John J. Kittel
Teresa V. Lynch

INVENTOR
George W. Bingham.
BY
Brock Beeken & Smith
ATTORNEYS.

G. W. BINGHAM.
MOVING PICTURE MACHINE.
APPLICATION FILED OCT. 25, 1909.

971,589.

Patented Oct. 4, 1910.

2 SHEETS—SHEET 2.

Witnesses:
John J. Kittel
Teresa V. Lynch.

Inventor
George W. Bingham.
By his Attorneys
Brock Beeken & Smith

UNITED STATES PATENT OFFICE.

GEORGE W. BINGHAM, OF BROOKLYN, NEW YORK, ASSIGNOR TO BINGHAM-CAMERON COMPANY, A CORPORATION OF NEW YORK.

MOVING-PICTURE MACHINE.

971,589.  Specification of Letters Patent.  Patented Oct. 4, 1910.

Application filed October 25, 1909. Serial No. 524,367.

*To all whom it may concern:*

Be it known that I, GEORGE W. BINGHAM, a citizen of the United States, and a resident of the borough of Brooklyn, in the county of Kings and State of New York, have invented certain new and useful Improvements in Moving-Picture Machines, of which the following is a specification.

My invention relates to improvements in moving-picture machines, generally, and in particular to the film handling mechanism thereof.

In a companion application of mine, Serial No. 524,366, I have disclosed mechanism for handling a moving picture film whereon the pictures are disposed in a plurality of rows, and for imparting a compound progressive and lateral shifting motion to the film, whereby the individual pictures of the different rows are successively brought into alinement with the exposure opening of the moving picture machine.

One object of the present invention is to simplify and reduce to as few parts as possible, the mechanism for imparting the motion to the film.

Another object is to combine in simple relation, the means for progressing the film and the means for imparting the lateral shifting movement thereto.

This invention relates more specifically to the means for imparting the lateral shifting motion to the film.

By "moving picture machine", I mean both the camera for taking the pictures and the projector for exhibiting the same. And by "film", also, I mean either the undeveloped negative for use in the camera, or the finished positive for use in the projector.

In this specification, I have spoken of the pictures as being arranged in rows. These pictures would actually appear in rows on the positive, but on the unfinished negative of course, the pictures would exist only as a continuous sensitized surface adapted to receive a plurality of rows of impressions.

In the companion application referred to, the film was shown in the form of a disk, which was carried by a movable film holder. Intermittent rotative motion was imparted to the disk by certain pawl and ratchet mechanism to progress the pictures successively into alinement with the exposure opening and the film was laterally shifted by a cam device so as to bring the different rows into register with the opening.

The present invention consists in its preferred form of a movable holder for the film, means, such as a pawl and ratchet, for imparting intermittent progressive motion to the film, and a pinion and rack connection between the holder and the frame or other stationary part of the machine for imparting a lateral shifting motion to the film. The rack may be either straight or curvilinear. Preferably it is of the latter form, in the shape of a sector. Also the rack may be carried by and move with the film holder. I prefer however that the rack shall remain relatively stationary and that the pinion be carried by the film holder.

The films may be made in various shapes and the rows of pictures may be disposed in any desired relation thereon. In a preferred form, the film is made in the shape of a disk and the rows of pictures are arranged in spiral order thereon.

When the film is in disk form, it is mounted upon a rotatable spindle in the film holder. In such a case as this, I prefer to place the pinion directly upon the same spindle, so that each intermittent rotative movement of the film, will cause, by reason of engagement between the pinion and rack, a corresponding lateral shifting movement of the film.

Various other features will appear as the specification proceeds.

In the accompanying drawings is illustrated one of the preferred constructions of my invention, but it will be understood that modifications and changes may be made therein without departing from the spirit and scope of the invention.

Figure 2:
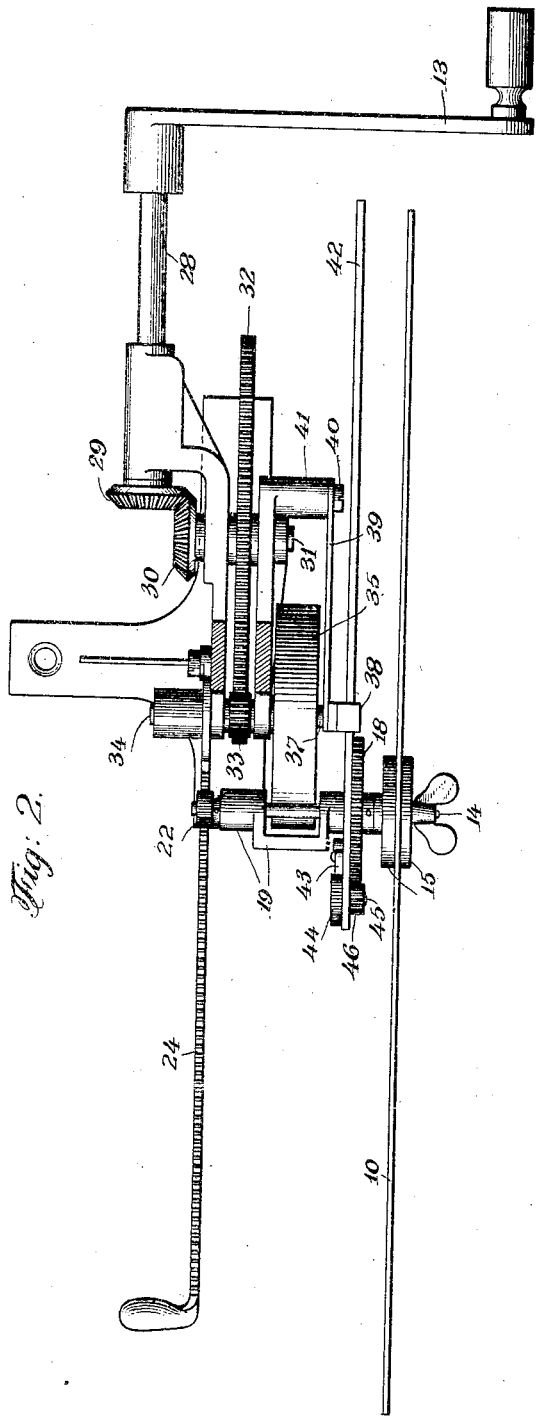

In the drawings: Figure 1 is a view in rear elevation of a preferred form of the invention, the extreme shifted position of the film holder being indicated in dotted lines. Fig. 2 is a sectional plan view of the invention on line 2—2 of Fig. 1.

Like reference characters denote corresponding parts throughout the several views.

10 indicates the film, which is here shown in the form of a sensitized disk provided with pictures or sensitized area, (which feature I have illustrated and claimed in my copending application Serial No. 524,366,) arranged in the present instance in rows to form a spiral. 11 indicates the exposure opening past which the pictures are successively brought. This disk 10 is mounted on the shaft or spindle 14, and is removably held between a pair of clamping plates 15 (only the rear one of which is shown in Fig. 1). The disk is preferably made sufficiently stable to maintain its upright position unaided, but if desired, guides may be provided for properly supporting the disk.

19 indicates a supporting arm carrying the shaft 14. This arm 19 is mounted on a pivot 20 so that the shaft 14, and with it the disk 10, can be moved laterally. If desired, this lateral motion may be a continuous straight one but in the present instance the lateral movement is curvilinear, as indicated in dotted lines on the figure.

Suitable means are provided for progressively rotating the disk 10. In the form here shown, these means consist of the pawl 43 engaging the ratchet 44, and mounted fast on the shaft 45. This shaft 45 carries a pinion 46, meshing with the gear 18 on the shaft 14. The means for operating the pawl and ratchet mechanism 43 and 44 may vary widely. According to this embodiment of the invention, it is constructed as follows: 28 indicates a driving shaft operated by the crank 13, or otherwise. This shaft carries a bevel gear 29 meshing with the bevel gear 30 on the shaft 31. The shaft 31 carries a large spur gear 32, which meshes with a pinion 33 on the shaft 34. The shaft 34 carries a cam 35 provided with a suitable cam groove 36 for the reception of the pin 37 carried by the block 38 mounted on the arm 39. This arm 39 is pivoted at 40 on the bracket 41.

Suitable means are provided for shifting the disk 10 laterally. In the present instance these means consist of a pinion 22 mounted on the spindle 14, which is adapted for engagement with the relatively stationary and laterally extending rack 24. This rack is preferably in the form of a sector, as shown, drawn on an arc having as its center the pivotal point 20. It will be understood from this that as the spindle is rotated to impart progressive motion to the disk, the pinion 22, by reason of its engagement with the rack 24, causes the film holder to be moved laterally with respect to the exposure opening of the machine. The extreme lateral position of the film holder is indicated in dotted lines. The rack and pinion are preferably held in yielding engagement with each other, as by means of a spring 26, so that when the holder has reached the limit of its lateral movement, it may be returned to its initial position by disengaging the rack from the pinion and moving the holder bodily over.

Mounted loosely on the shaft 14, is a self-adjusting connection interposed between the fixed driving train of gears on the machine and the movable driving train which progresses and laterally shifts the film. This connection may be in the form of a long lever 42, which is hung loosely on the shaft 14, and which extends from the block 38. In this manner the cam 36 will impart vibration to the lever 42. On one end of this lever is carried the shaft 45, ratchet 44, and pinion 46. Also fixed to this end of the lever 42 is the spring actuated pawl 43. During the upward movements of the outer end of the arm 42, carrying the shaft 45, ratchet 44, and pinion 46, the gear-wheel 18 is at rest and consequently at the same time, the pinion 22, arm 19, and disk 10, are at rest also, these rest periods being the times for the exposures at the opening 11. During the downward movements of the outer end of the arm 42, the pawl 43 will hold the ratchet 44, and pinion 46, from rotating, and hence during such movements the pinion-wheel 46, being in rigid engagement with the gear-wheel 18, will, without itself rotating, cause said wheel to rotate and impart its movement to the disk 10 and pinion 22. As the lever 42 gradually slides through the sleeve or block 38, which represents the point at which power is applied to rock said arm on the shaft 14 as a fulcrum, the extent of said arm between said sleeve and the shaft increases, and hence the throw of the arm becomes less and the pinion wheel 46, has a gradually decreasing sweep, with the result that the step-by-step or intermittent rotations of the gear wheel 18 and disk 10 are gradually decreased in length, the farther the carrying arm 19 is turned laterally from its initial vertical position, or in other words, the farther the center of the disk 10 is carried from the vicinity of the exposure opening 11, the gradually decreasing throw of the lever arm 42, and the consequent gradual decrease in the length of the intermittent rotations of the gear wheel 18 and disk 10, are essential in the present form of the invention, because of the gradually enlarging spiral line of sensitized area on the disk 10 to be uniformly brought before the exposure opening 11. If an individual circle of equally spaced sensitized area on the disk 10 were to be brought before the opening 11, the disk would be given a uniform step-by-step rotary motion.

By means of the apparatus disclosed, I am enabled to impart to the disk a very quick progressive shifting movement and I am thereby enabled to dispense with the use of a shutter. If for any reason it is found desirable to use a shutter, this may be provided for by having the cam 35 carry one or more wings or shutter blades.

When a positive disk has been rotated and moved to effect the projection of all its pictures, it may be restored to its initial starting position instantly, simply by disengaging the rack and pinion and moving the holder back to the first position. The machine may then again be operated to repeat the exhibition if desired, or a new film may be placed in the machine.

The advantages of the present invention are numerous. One of the chief of these resides in the fact that a sensitized film disk can be placed in a camera having the film controlling construction disclosed herein, and after the pictures are taken successively they may be printed in a single operation on a film to be used in a projector instead of being printed one at a time, as heretofore. This film when inserted in a projector of the construction shown herein, will then bear the pictures in the same order and relation and they will properly register with the mechanism of the projector. Furthermore, the disks are under no strain when in the machine and hence will last an indefinite length of time even with repeated use, and they may be compactly stored or packed for shipment. The disks may bear a large number of pictures within limited space and hence are economical in the material used.

What is claimed is:

1. In a moving picture machine, a rotatable film holder mounted to oscillate on a center outside of its axis of rotation, means for imparting a progressive rotary movement to the film holder, and means for imparting a lateral shifting movement to said holder comprising a rack and a rotatable pinion, one of which is carried by the film holder and the other of which is stationary.

2. In a moving picture machine, a movable film holder, means for imparting a progressive movement to the film carried thereby, and means for imparting a lateral shifting movement to said holder comprising a rack sector, and a rotatable pinion carried by the film holder and in engagement with said sector.

3. In a moving picture machine, a movable film holder, means for imparting a progressive movement to the film carried thereby, and means for imparting a lateral shifting movement to said holder comprising a rack sector, a rotatable pinion carried by the film holder and in engagement with said sector, and means for yieldingly holding the rack and pinion in engagement.

4. In a moving picture machine, a rotatable film holder mounted to swing on a center outside of its axis of rotation, means for imparting a progressive rotary movement to the film holder, and means for imparting a lateral shifting movement to said film holder comprising a rack and a rotatable pinion, one of which is carried by the film holder and the other of which is stationary, said rack being in the form of a sector, whereby the film holder is caused to move in a curved path.

5. In a moving picture machine, a rotatable spindle upon which the film is carried, a pinion on said spindle, and a rack adapted for engagement by said pinion to impart a lateral shifting movement thereto.

6. In a moving picture machine, a movable film holder, a relatively stationary rack, and a member carried by the said holder adapted for engagement with the rack to impart motion to the film holder.

7. In a moving picture machine, a movable film holder, a relatively stationary rack, and a pinion carried by said holder adapted for engagement with said rack to impart motion to the holder.

8. In a moving picture machine, a movable film holder, actuating means for advancing the film carried thereby, and a relatively stationary part, the said actuating means adapted for engagement with said relatively stationary part to impart lateral movement to the film holder.

9. In a moving picture machine, a movable film holder, a film rotatably mounted therein, a pinion rotatable with said film, and a relatively stationary rack adapted to be engaged by the said pinion to impart movement to the said holder.

10. In a moving picture machine, a shiftable film holder, a relatively stationary rack, a member on the holder and movable with the film adapted to engage the rack to impart shifting movement to the holder, and means for disengaging said rack and member.

11. In combination with a moving picture machine provided with an exposure opening, a movable film holder, a stationary rack, and means carried by the holder in engagement with the rack to move the said holder, whereby the film in the holder is carried in a lateral direction past the exposure opening.

12. In a moving picture machine, a movable film holder, a pinion carried thereby, and a rack adapted to be engaged by said pinion to impart a shifting movement to the holder, the said rack adapted to be disengaged from the pinion to permit the holder to be returned to its original position.

13. In a moving picture machine, a movable film holder, a film supported therein, means for imparting an intermittent movement to said film, a relatively stationary rack, and means engaging said rack to impart a lateral shifting movement to said holder.

14. In a moving picture machine, a movable film holder, a film journaled to rotate thereon, a pinion movable with said film holder, means engaging said pinion to impart intermittent rotation thereto, and a rack engaged by said pinion to impart shifting movement to the film holder.

15. In combination with the movable film holder of a moving picture machine, a rotatable pinion carried thereby, and a rack held in yielding engagement with said pinion.

16. In a moving picture machine, a pivoted film holder, a relatively stationary rack, and a pinion carried by said holder adapted for engagement with the rack to impart a swinging movement to the holder.

17. In a moving picture machine, a movable film holder, a spindle journaled thereon, driving means for said spindle, a pinion on said spindle, and a relatively stationary rack adapted to be engaged by said pinion.

18. In a moving picture machine, a film holder, a spindle journaled therein, pawl and ratchet mechanism for imparting intermittent rotation to said spindle, a pinion on said spindle, and a relatively stationary rack adapted to be engaged by said pinion.

19. In combination, a pivoted support, a spindle carried thereby, actuating means for said spindle, a relatively stationary rack, a pinion on the spindle riding over said rack, and a spring normally holding said rack in engagement with the pinion.

20. A film holder for moving picture machines, comprising a support and a rotatable spindle carried thereby on which the film is adapted to be held, mechanism for imparting an intermittent progressive movement to the spindle and the film carried thereby, a pinion on the end of said spindle, and a rack adapted for engagement by said spindle.

Signed at New York, in the county of New York and State of New York, this 22nd day of October, A. D. 1909.

GEORGE W. BINGHAM.

Witnesses:
PHILIP S. MCLEAN,
TERESA V. LYNCH.